US008510350B2

(12) United States Patent
Isaacson

(10) Patent No.: US 8,510,350 B2
(45) Date of Patent: Aug. 13, 2013

(54) METHODS AND APPARATUS FOR DISTINGUISHING FILES FROM ONE ANOTHER IN A FILE SYSTEM IN A COMPUTING ENVIRONMENT

(75) Inventor: Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 419 days.

(21) Appl. No.: 12/322,580

(22) Filed: Feb. 3, 2009

(65) Prior Publication Data

US 2010/0199216 A1    Aug. 5, 2010

(51) Int. Cl.
*G06F 12/00* (2006.01)
*G06F 17/30* (2006.01)

(52) U.S. Cl.
USPC ............................................. 707/822

(58) Field of Classification Search
USPC .......................................... 707/822, 999.003
See application file for complete search history.

(56) References Cited

U.S. PATENT DOCUMENTS

| | | | | |
|---|---|---|---|---|
| 6,055,543 | A * | 4/2000 | Christensen et al. | 1/1 |
| 2003/0163453 | A1* | 8/2003 | Yang et al. | 707/3 |
| 2005/0076031 | A1* | 4/2005 | Xu et al. | 707/9 |
| 2005/0086268 | A1* | 4/2005 | Rogers | 707/200 |
| 2005/0240590 | A1* | 10/2005 | Shimizu et al. | 707/9 |
| 2007/0078821 | A1* | 4/2007 | Kubo et al. | 707/3 |
| 2007/0088761 | A1 | 4/2007 | Shimizu et al. | |
| 2007/0198484 | A1* | 8/2007 | Ahmed et al. | 707/3 |
| 2007/0255677 | A1 | 11/2007 | Alexander et al. | |
| 2008/0294600 | A1 | 11/2008 | Clark et al. | |
| 2008/0301589 | A1 | 12/2008 | Carlson et al. | |

OTHER PUBLICATIONS

"File attribute" Nov. 11, 2008 http://en.wikipedia.org/wiki/File_attribute 1 page.
"The Filesystem Manager" Printed Jan. 19, 2009 http://www.swd.de/documents/manuals/sysarch/fsys_en.html 18 pages.
"Metadata" Jan. 19, 2009 http://en.wikipedia.org/wiki/Metadata 15 pages.
"Beagle" Printed Jan. 6, 2009 http://beagle-project.org/Image:BeagleScreenie_crop.png 2 pages.
"Beagle" Nov. 23, 2008 http://beagle-project.org/Main_Page 3 pages.
"Symbolic line" Nov. 23, 2008 http://en.wikipedia.org/wiki/symbolic_link.
Google Chrome Printed Jan. 6, 2009 http://www.google.com/chrome 1 page.
Screen shot of cite No. 7, printed Jan. 6, 2009 1 page.

* cited by examiner

*Primary Examiner* — Alexey Shmatov
(74) *Attorney, Agent, or Firm* — King & Schickli, PLLC

(57) ABSTRACT

Methods and apparatus uniquely distinguish one file from another in a file system. In one embodiment, a flat architecture uses metadata of files for distinguishment, but files can have identical names and pathname(s) are unneeded. During a file save or find operation, users supply terms useful to themselves regarding the file, but created underlying metadata distinguishes all files. Also, an ever-decreasing list of possible file matches accompanies the save or find operation as users enter more save or search terms regarding files under present consideration. Other features contemplate a user interface (UI), a file system manager and an API exposed to other applications/computing devices. Computer program products are also disclosed.

13 Claims, 8 Drawing Sheets

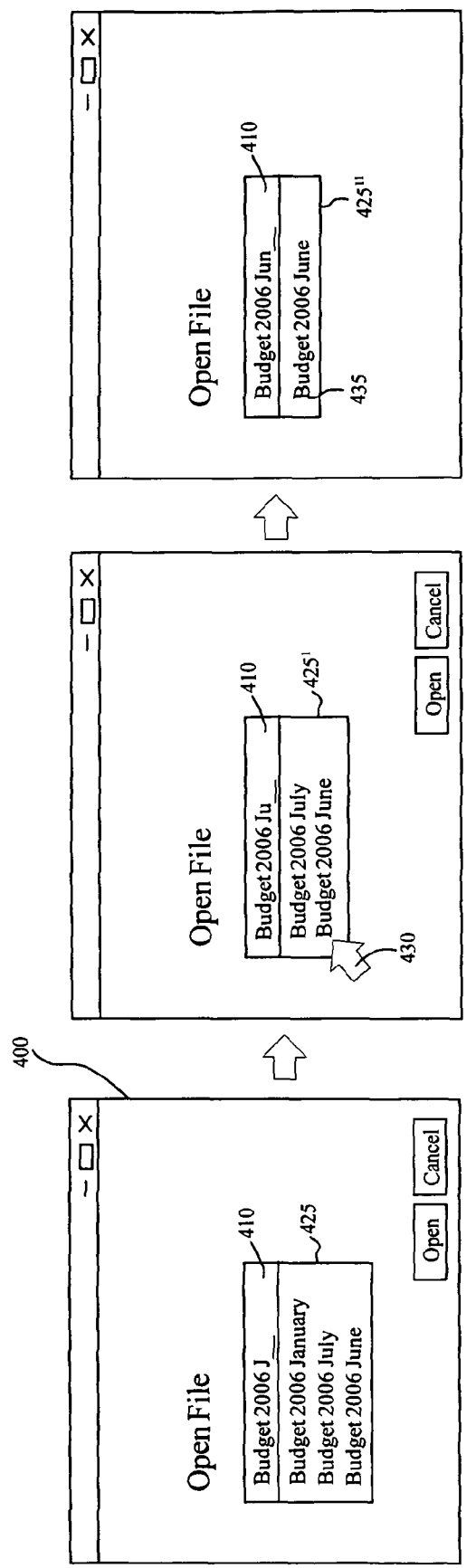

METHODS AND APPARATUS FOR DISTINGUISHING FILES FROM ONE ANOTHER IN A FILE SYSTEM IN A COMPUTING ENVIRONMENT

FIELD OF THE INVENTION

Generally, the present invention relates to computing file systems. Particularly, although not exclusively, it relates to file systems using metadata to uniquely distinguish every file from every other file in the same architecture and using it to find and save files. Representative features make superfluous the need for pathname(s) to save and find files and identical file names are available for use. Computer program products are also disclosed.

BACKGROUND OF THE INVENTION

As is known, a computing file system (FS) stores, organizes, manipulates and retrieves computer files and they data they contain. Many file systems are known and each has its own nuances for storing files and later retrieving them. Some of the more popular file systems include FAT, NTFS, UNIX file system (UFS), XFS, JFS, ReiserFS, HFS, ZFS, JFFS2, YAFFS, 9P, and extended files system (e.g., ext2, ext 3), to name a few.

To store data, file systems interact with storage devices, such as hard disks, flash memories, CD-ROM's etc. The devices can be local on a computing device maintaining the physical location of the files, or remote, such as on a network file server. In either, it is common to arrange the files in "sectors" and file system software (often integral with the operating system) organizes the sectors by keeping track of whether sectors are used, whether and how much space exists for future files, which sectors belong to which file, and the like. Other properties or attributes are also regularly kept in modern file systems. For example, it is now common to store a length of the data in the file, as well as the time that it was first created, last modified, last accessed, etc. Still other information includes device type (e.g., block, socket, etc.), file owner, access permission(s), author, checksums, etc.

Also, file systems typically utilize directories to associate file names with files. Usually, they connect the file name to an index in a file allocation table (FAT) in a DOS file system, or an inode in a UNIX-styled file system. Most modern directories are also hierarchical. While useful for a great many things, such as visual and practical file arrangement, they have limitations for finding certain files, storing and finding distinct files with duplicate file names, and utilizing multiple file names for the same file. They also require two or more items when searching and saving files, especially file name and pathname.

For example, in a hierarchy having a directory of "bar 1" and "bar 2," two similar or distinct files can exist simultaneously with the same file name "foo" since their file pathnames are distinct, i.e., "bar1/foo" and "bar2/foo." While some specialized file systems allow for files of the same name in the same directory, they force uniqueness values in their metadata to show the files as truly different. In other file systems, entering duplicate names forces users to rename their files to make them prima facie unique.

In any file system, users commonly utilize file names having meaning or relevance regarding the underlying data so that the files can be easily organized and found later during searching. They also commonly create multiple directories, each with sub-directories, each with meaningful file names. For example, "budget/2008/June" and "budget/2008/July" are relevant to, first, a budget of a family or company and, second, to monthly budgets, especially June and July in the year 2008. Later, upon subsequent searching for the monthly budget data for June and July, 2008, users know exactly where to look in the file system based on the names of the directories, sub-directories, and files.

However, some files need to belong to two or more directories to be found this way, which is why some file systems allow for "softlinks." Softlinks, as are known, allow for what looks like a second file, but are mostly pointers to the first file with a different name or even a different directory, e.g., "budget/2008/June" and "expenses/2008/June" might be the same file.

In other architectures, some directories are known to be "flat." That is, the files are not hierarchical, but are saved at the same root level. While avoiding some of the problems in the hierarchy architecture, they have unique other problems since every file must have a different name and, as files in the system grow, inefficiency abounds which makes it difficult for users to organize data into related groups. As Apple, Inc., quickly found out with their original, flat Macintosh File System (MFS), every file on disk had to have a unique name, even if they appeared to be located in separate folders in their save and find file dialog boxes. Its version did this with file management software, named Macintosh Finder, which created the hierarchy illusion in the folders. It was also eventually replaced with the Hierarchical File System (HFS), which supported true directories.

In other flat architectures, it has been known to "pad" fields with whitespace of fixed widths, or to delimit them by one or more separation characters. In "Unix-like" operating systems, some virtual file systems appear to make all the files on all the devices appear to exist in a single hierarchy. In some embodiments, this occurs by assigning a device name to each device, but such is not how the files on other devices are accessed. Rather, an operating system is first informed where in the directory tree those files should appear. This process is well known and called "mounting" a file system. Generally, only a system administrator (i.e. root user) may authorize mounting.

With the advent of modern search mechanisms, it is not uncommon for search tools to require search terms of file "name," "content," or both. However, if users are trying to locate files in voluminous systems, this is problematic since users often forget whether certain keywords were placed in the file name or in the content. It is especially difficult when users search for files created and saved by authors other than themselves.

Accordingly, a need exists in the art of file systems for overcoming the foregoing and other problems. More particularly, the need contemplates a filing system having improved file finding/searching and saving abilities, better file naming conventions, including allowing duplicate names for different files and multiple names for same files, and the avoidance of search/save complexities, such as needing file pathname(s). Naturally, any improvements along such lines should further contemplate good engineering practices, such as security, stability, ease of implementation, unobtrusiveness, useful user interface (UI) mechanisms, etc.

SUMMARY OF THE INVENTION

The above-mentioned and other problems become solved by applying the principles and teachings associated with the hereinafter-described file system in a computing environment. At a high level, methods and apparatus uniquely distinguish files from one another in a file system, but without restrictive naming practices or requiring tedium during file/save operations.

In a representative embodiment, metadata accompanies files. In turn, the metadata, not names, or pathnames, distinguishes the files from one another. Metadata is extensive and includes, but is not limited to, descriptive metadata, administrative metadata, structural metadata, technical metadata, use metadata, relationship metadata, purpose metadata, etc. Metadata is also unlimited, but for memory or disk size constraints.

During file save or find operations, users supply terms useful to themselves regarding the file, but underlying metadata is used to populate a list of possible file matches. Also, an ever-decreasing list of possible file matches accompanies the save or find operation as users enter more save or search terms regarding files under present consideration. In other embodiments, features contemplate a user interface (UI), a file system manager and an API exposed to other applications/computing devices.

Computer program products are also contemplated. Also, the products include executable instructions to configure computing devices with file systems, searching/find operations, UI interfaces, etc. The computer program products may also exist as downloads from upstream computing devices or on a computer readable medium. The computer program products are also available for installation on a network appliance or individual computing devices.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 4A-4C are diagrammatic views in accordance with the present invention of representative open file (alternatively a search file, find file, etc.) operation;

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for a filing system in a computing environment.

Figure 1:
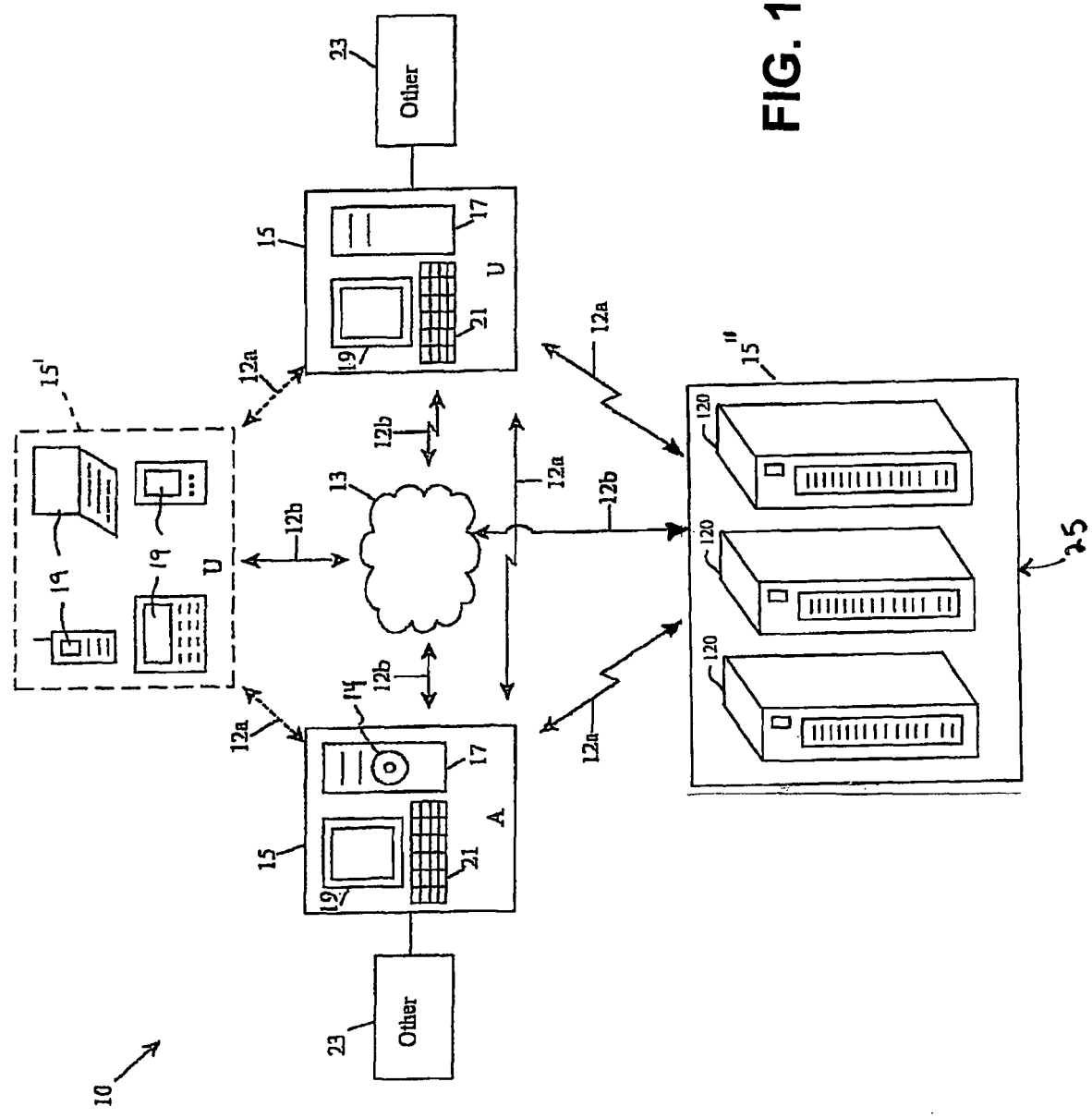
FIG. 1 is a diagrammatic view in accordance with the present invention of a representative computing system environment for a file system.

With reference to FIG. 1, a representative computing system environment 10 for practicing certain or all aspects of the invention includes one or more computing devices 15, 15', 15" arranged as individual or networked physical or virtual machines that utilize filing systems, including clients or hosts arranged with a variety of other networks and computing devices. In a traditional sense, an exemplary computing device typifies a server 120, such as a grid or blade server regularly found in a data center 25. Brand examples include, but are not limited to, a Windows brand Server, a SUSE Linux Enterprise Server, a Red Hat Advanced Server, a Solaris server or an AIX server. Alternatively, it includes a general or special purpose computing device in the form of a conventional fixed or mobile (e.g., laptop) computer 17 having an attendant monitor 19 and user interface 21. The computer internally includes a processing unit for a resident operating system, such as DOS, WINDOWS, MACINTOSH, LEOPARD, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, or the like. The other items may also be stand alone computing devices 15', 15" in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, switches, modems, T# lines, satellites, microwave relays or the like. The connections may also be local area networks (LAN), metro area networks (MAN), and/or wide area networks (WAN) that are presented by way of example and not limitation. The topology is also any of a variety, such as ring, star, bridged, cascaded, meshed, or other known or hereinafter invented arrangement.

Figure 2:
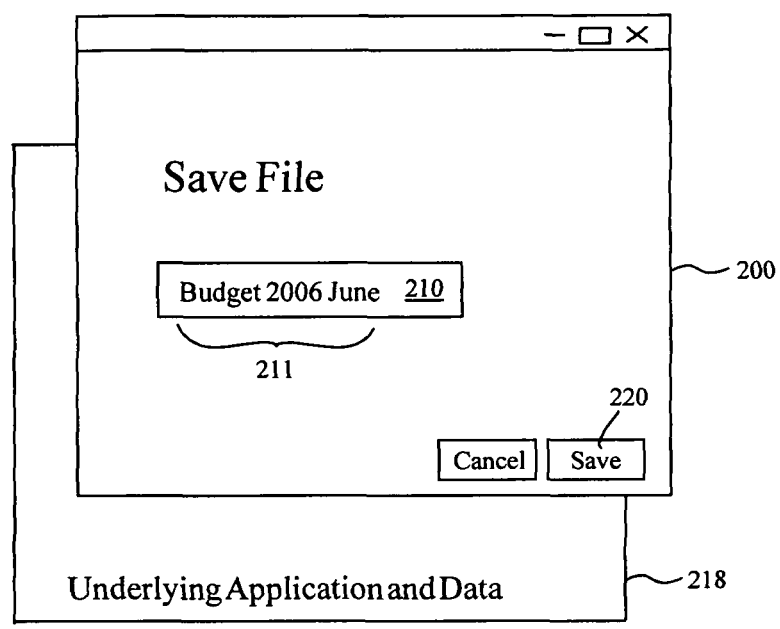
FIG. 2 is a diagrammatic view in accordance with the present invention of a representative save file operation.

With the foregoing representative computing environment as backdrop, FIG. 2 illustrates a file save operation in a UI dialog box 200 for an underlying application and its data 218. In a field 210, a user enters letters, text, numbers, etc. 211, to represent or describe the underlying data. They then indicate saving of the file, such as by selection of the save icon 220, and the file becomes part of the filing system architecture.

Figure 3:
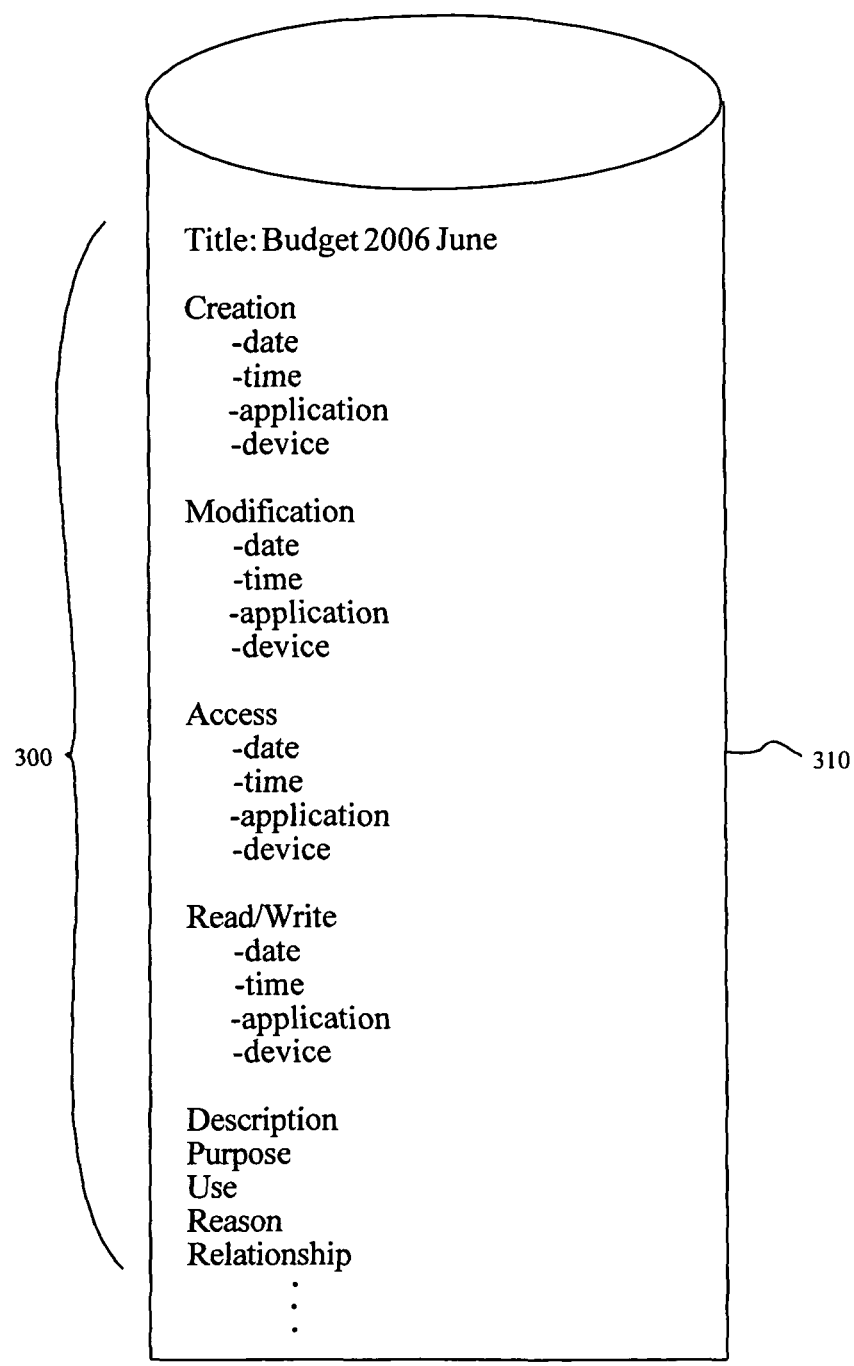
FIG. 3 is a diagrammatic view in accordance with the present invention of representative file metadata.

Underlying the data, in FIG. 3, metadata 300 is created and saved in a volume 310 for the same file. As is typical, a computing operating system interfaces with the computing applications in which files are developed and metadata is created on the go, upon saving, etc. Indicia of the volume are many and can be computing memory, or disk space, or external to a computing device, such as in a flash system, file server, etc. The metadata can also exist with the file itself or separate from it. It can be kept in directory entries, in specialized structures, such as inodes, or even in the name of a file. The metadata is also theoretically unlimited in size per any given file and only the size of the disk, memory, etc., truly limits its attributes that describe it.

In form, representative metadata includes, but is not limited to: a Title, entered by the user as in FIG. 2, and not restricted to non-duplicate names for dissimilar files or multiples for the same file, as in the prior art; file Creation time, date, application name, device, etc., as recorded or time-stamped by one or more applications or computing systems (e.g., FIG. 1); file Modification time, date, application name, device, etc., as recorded or time-stamped by one or more applications or computing systems (e.g., FIG. 1); file Access time, date, application name, device, etc., as recorded or time-stamped by one or more applications or computing systems (e.g., FIG. 1); reads and writes to the file and time, date, application name, device, etc., as recorded or time-stamped by one or more applications or computing systems (e.g., FIG. 1); file Description, entered by the user as in FIG. 2; file Purpose, entered by the user as in FIG. 2; file Use, entered by the user as in FIG. 2; Reason for having file, entered by the user as in FIG. 2; and Relationships or Associations to other files, users, devices, owners, authors, etc., entered by the user as in FIG. 2. In still other metadata, the foregoing can be assembled to successfully develop and use it, and various classifications or types of metadata can be developed. Representatively, metadata genuses can be grouped as descriptive metadata, administrative metadata, structural metadata, technical metadata, and use metadata. Naturally, depending upon file type, a document versus a photograph, metadata will vary. Metadata is also a relative term in that data in one file may become metadata in another. For instance, an audio file for a song, may be an originally saved file. A document may later reference the song and append it to the document, and the song file then becomes metadata of the document, and so on. Metadata can also include icons and free-text comments, attribute-value pairs, etc. Metadata is also largely well known and skilled artisans can contemplate other scenarios.

With reference to FIGS. 4A-4C, upon a user later needing to find an earlier saved file, they enter into a find or search operation. In a UI dialog box 400, they enter search terms into a field 410. The terms, unlike the prior art, avoid needing a file pathname. Instead, the metadata of each file distinguishes every file from every other file in the filing system and files can be found simply by looking for relevant terms. Also, as the user enters terms into the field, a list of possible file matches 425 is presented to the user. As the user enters more terms into the field, the list becomes ever-decreasing in the number of possible file matches 425', 425", as seen by comparing the three figures. Users can at any time simply select 430 one of the files in the list for opening, or continuing entering terms until they "zero-in" on a single file 435 of interest. Ultimately, it is now no longer necessary for users to remember the exact name of a file of interest or to remember its location/pathname in order for users to find files.

Figure 4D:
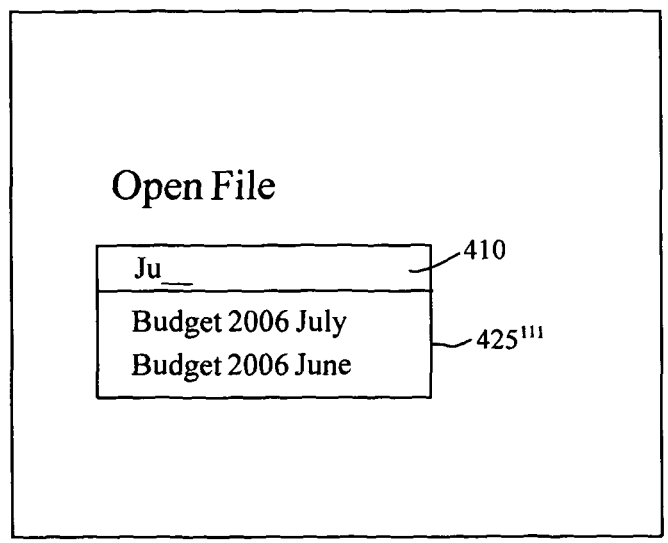
FIG. 4D is a diagrammatic view in accordance with the present invention of an alternate open file operation.

Also, a new file system results where files are stored in a single, flat container that has no hierarchy and files do not have traditional names, they just have content or attributes. In other words, users do not open the file "budget/2006/June" by its name "June" inside the "2006" sub-directory in the "budget" directory, users now open the file by its title and by referencing the content. As seen in FIG. 4D, for example, rearranging the search terms in field 410 begets the list of possible file matches 425''' just the same as in the earlier example. Of course, other examples are possible and skilled artisans can readily imagine them.

Figure 5A:
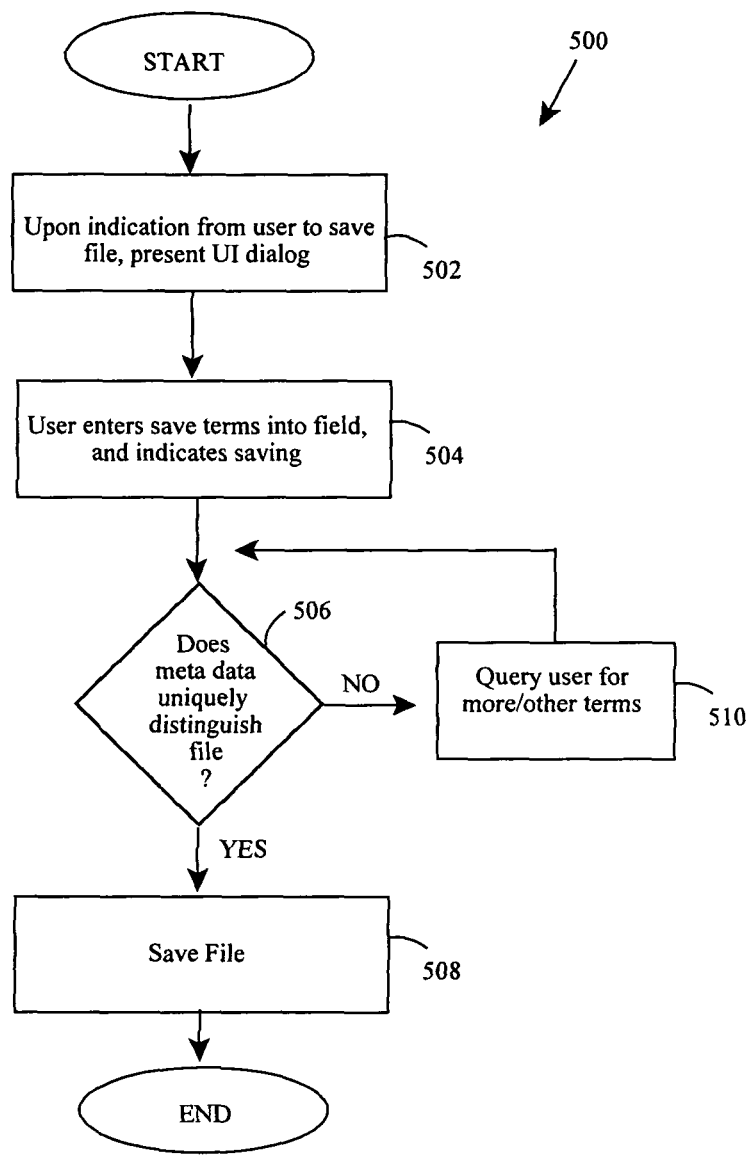
FIGS. 5A and 5B are flow charts in accordance with the present invention of representative save and open file operations.
Figure 5B:
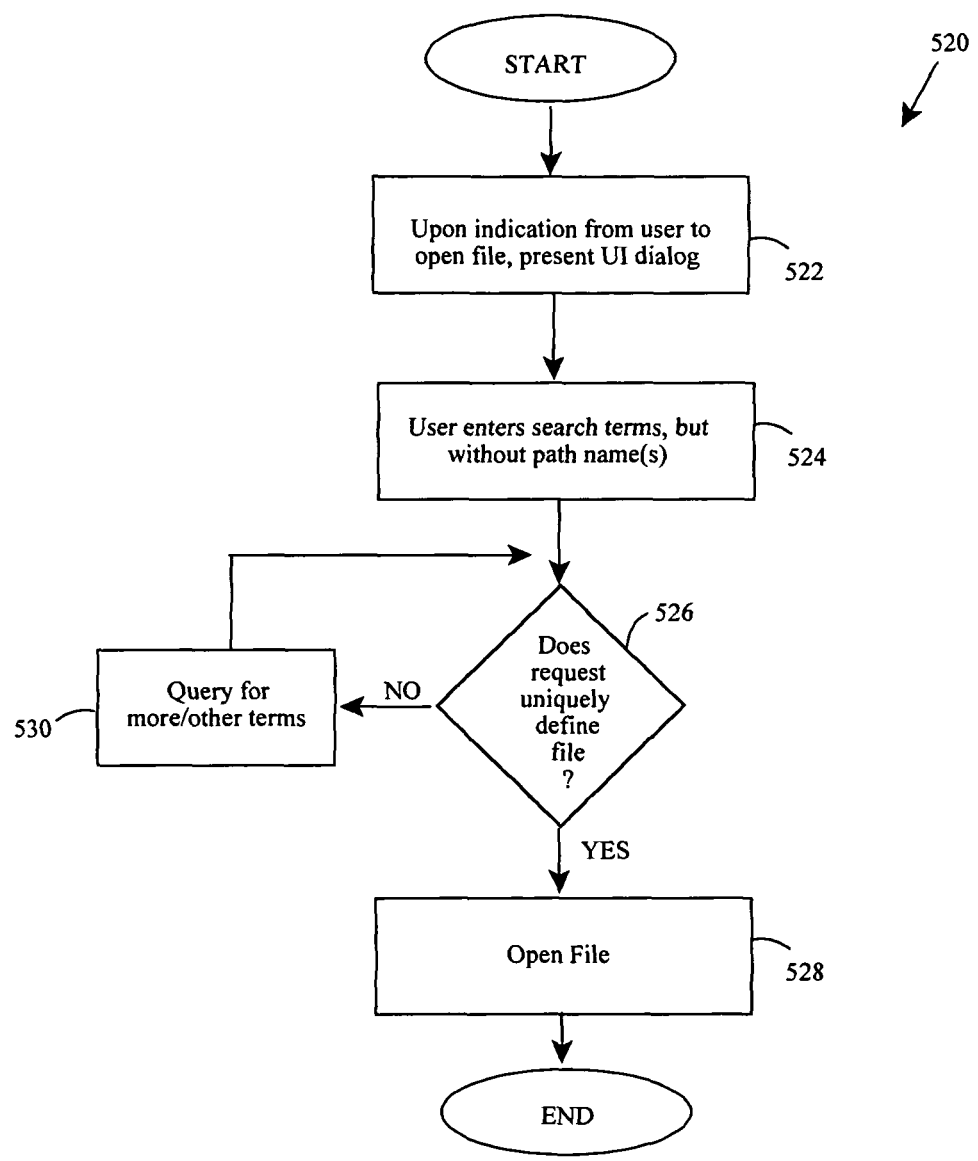

With reference to FIGS. 5A and 5B, high-level diagrams 500, 520 show file save and open operations. In either, users will indicate their desire to save or open a file 502, 522. Upon such, a UI dialog box, such as in FIGS. 2 and 4, are presented to the users and they enter relative terms therein, 504, 524. They also do so without any restrictive naming practices or the need for introducing file pathname(s). Then, in the save operation, to the extent the metadata of the file uniquely distinguishes the file from every other file of the file system, 506, the file is saved, 508. Otherwise, the user is queried for additional or other terms that will make the file under present consideration unique from all other files, 510.

Similarly, in the find operation, to the extent the search terms uniquely define the file the user is looking for, 526, the file is opened, 528, such as through the process in FIG. 4. Otherwise, the user is queried for additional or other terms that will make the file under present consideration unique from all other files, 530.

It is likely in the save operation, that metadata for file creation date and time will adequately distinguish every file from every other file, and the additional query be largely avoided. In the find operation, the ability to ever-decrease the list of possible file matches will likely overshadow requiring additional queries in this context.

Figure 6:
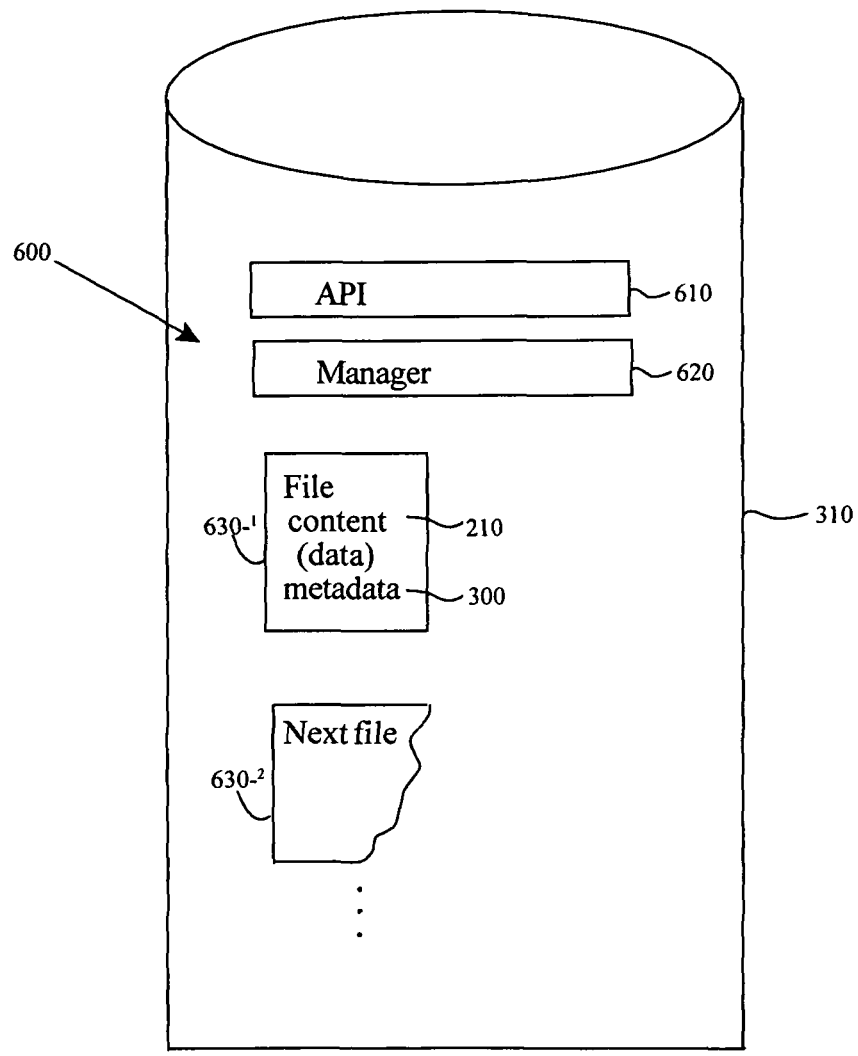
FIG. 6 is a diagrammatic view in accordance with the present invention of a representative manager and API.

With reference to FIG. 6, a file system 600 includes an API 610 that is largely exposed to other applications, other computing devices, etc. In this manner, the file operations can occur quickly to create the list of possible matches for users as they look for files. Also, a file manager 620 may exist to provide traditional administration functions in the file system. It may coordinate activities, e.g., requests, from applications to open or save files, or in the context of network connectivity to servers for browsing, or the like. It may also coordinate the metadata 300 of the files 630, such as its storage, its usage, etc. The file manager will likely assume responsibility for traditional operations such as create, open, view, print, play, rename, move, copy, delete, assigning/removing permissions, or the like.

Appreciating that enterprises can implement procedures with humans as well as computing devices, skilled artisans will understand that file systems, UI's, metadata, etc., may be managed by people, such as system administrators, as well as executable code, or combinations of each. As such, methods and apparatus of the invention further contemplate computer executable instructions, e.g., code or software, as part of computer program products on readable media, e.g., disks 14, FIG. 1, for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

Ultimately, certain advantages of the invention over the prior art should now be readily apparent. For example, users are now able to use metadata, attributes, tags, content, etc., to create and find files in a file system rather than paths and names and locations. As such, files are uniquely identified based on their purpose and use rather than their name. Further, finding files now has merged the concept of searching for a file and a location into a more simple activity, such as "stating" the file. Also, while users can control certain metadata of a file, the file system remains cognizant to ensure uniqueness in files, such as by automatically recording events, attributes, tags, etc., and to the extent necessary, inquiring of users for additional information/terms to ensure uniqueness.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures or expanding the system to replicate the embodiments multiple times.

The invention claimed is:

1. In a computing system environment having at least one computing device, a file system residing on at least one computing device, comprising: a flat architecture for a plurality of files, each file comprising metadata and data content created upon file saving wherein the metadata other than a file name uniquely distinguishes said each file of the file system from every other file of the file system and is used entirely for finding any file in the file system under present consideration such that upon a file saving or finding operation, a hierarchical position of said any file under resent consideration is unneeded and duplicate file names are allowed for said an file under present consideration and said every other file, and a UI having no file pathname requirement for users for said file saving and said finding operations, whereby a user is automatically queried for more terms describing said any file under present consideration if the created metadata does not uniquely distinguish said any file under present consideration from said every other file of the file system.

2. The file system of claim 1, further including a list of possible file matches that are presented to a user upon said finding.

3. The file system of claim 2, wherein the list of possible file matches is configured to decrease in possible numbers of matches as the user increases search terms during the finding.

4. The file system of claim 2, whereby the user can select one file from the list of possible file matches.

5. The file system of claim 1, further including an API exposed to other computing applications and computing devices.

6. In a computing system environment having at least one computing device, a method for uniquely distinguishing every file of a flatly arranged file system from every other file of the flatly arranged file system, comprising:
providing a UI having no file pathname requirement for users for a file save and a file find operation;
receiving from a user terms describing a file under present consideration during said file save or find operation;
creating metadata for said file under present consideration;
while allowing duplicate file names for said file under present consideration of the flatly arranged file system and said every other file of the flatly arranged file system determining whether the created metadata uniquely distinguishes the file under present consideration from said every other file of the file system such that upon the file save or find operation, a hierarchical position of said file under present consideration in unneeded;
determining whether the terms describing the file under present consideration uniquely distinguish the file under present consideration from said every other file of the file system; and
automatically querying the user for more said terms if the created metadata does not uniquely distinguish the file under present consideration from said every other file of the file system.

7. The method of claim 6, further including presenting to the user a list of possible file matches during said file find operation.

8. The method of claim 7, further including decreasing possible numbers of matches in the presented list of possible file matches as the user increases search terms during the file find operation.

9. The method of claim 7, further including receiving a selection from the user for one file from the presented list of possible file matches.

10. A computer program product on a non-transitory computer readable storage medium for installing on a computing device to uniquely distinguish every file of a flatly arranged file system from every other file of the flatly arranged file system, the computer program product having computer-executable instructions recorded on the computer readable storage medium for loading on the computing device to:
provide a UI having no file pathname requirement for users for a file save or a file find operation such that upon the file save or file find operation, a hierarchical position of said every file is unneeded;
allow duplicate file names for a file under present consideration and said every other file of the flatly arranged file system;
receive terms describing the file under present consideration during the file save or find operation;
create metadata for said file under present consideration;
determine whether the created metadata alone uniquely distinguishes the file under present consideration from said every other file of the flatly arranged file system; and
automatically query for more said terms if the created metadata does not uniquely distinguish the file under present consideration from said every other file of the flatly arranged file system regardless of whether identical file names exist for said file under present consideration and said every other file of the flatly arranged file system.

11. The computer program product of claim 10, further including executable instructions to present a list of possible file matches during said file save or find operation.

12. The computer program product of claim 11, further including executable instructions to decrease possible matches in the presented list of possible file matches as the user increases search terms during the file find operation.

13. The computer program product of claim 11, further including executable instructions to receive a selection from a user for one file from the presented list of possible file matches.

* * * * *

UNITED STATES PATENT AND TRADEMARK OFFICE
CERTIFICATE OF CORRECTION

PATENT NO.        : 8,510,350 B2
APPLICATION NO.   : 12/322580
DATED             : August 13, 2013
INVENTOR(S)       : Isaacson It is certified that error appears in the above-identified patent and that said Letters Patent is hereby corrected as shown below:

In the Claims

Column 7, line 34, claim 1, replace "resent" with -- present --.

Column 7, line 35, claim 1, replace "an" with -- any --.

Signed and Sealed this
Twenty-fifth Day of March, 2014

Michelle K. Lee
*Deputy Director of the United States Patent and Trademark Office*